US009349360B2

(12) United States Patent
Hummel

(10) Patent No.: US 9,349,360 B2
(45) Date of Patent: May 24, 2016

(54) ACCELEROMETER AND GYROSCOPE CONTROLLED TONE EFFECTS FOR USE WITH ELECTRIC INSTRUMENTS

(71) Applicant: Markus Oliver Hummel, San Jose, CA (US)

(72) Inventor: Markus Oliver Hummel, San Jose, CA (US)

( * ) Notice: Subject to any disclaimer, the term of this patent is extended or adjusted under 35 U.S.C. 154(b) by 0 days.

(21) Appl. No.: 14/629,692

(22) Filed: Feb. 24, 2015

(65) Prior Publication Data

US 2015/0179158 A1 Jun. 25, 2015

Related U.S. Application Data

(63) Continuation-in-part of application No. 14/073,689, filed on Nov. 6, 2013, now Pat. No. 9,012,759.

(60) Provisional application No. 61/946,450, filed on Feb. 28, 2014, provisional application No. 61/948,448, filed on Mar. 5, 2014, provisional application No. 61/724,106, filed on Nov. 8, 2012.

(51) Int. Cl.

| | |
|---|---|
| ***G01P 3/02*** | (2006.01) |
| ***G10H 1/02*** | (2006.01) |
| ***G10H 7/00*** | (2006.01) |
| ***G10H 3/00*** | (2006.01) |
| ***G10H 1/00*** | (2006.01) |
| ***G10H 1/32*** | (2006.01) |
| ***G10H 1/34*** | (2006.01) |
| ***G10H 3/18*** | (2006.01) |

(52) U.S. Cl.

CPC ............... *G10H 3/00* (2013.01); *G10H 1/0091* (2013.01); *G10H 1/02* (2013.01); *G10H 1/32* (2013.01); *G10H 1/342* (2013.01); *G10H 3/186* (2013.01)

(58) Field of Classification Search

CPC ......... G10H 3/00; G10H 1/0091; G10H 1/02; G10H 1/32; G10H 1/342; G10H 3/186; G10D 1/085

USPC .................................................... 84/737, 743

See application file for complete search history.

(56) References Cited

U.S. PATENT DOCUMENTS

| | | | | |
|---|---|---|---|---|
| 4,509,190 | A * | 4/1985 | Spector | 381/61 |
| 5,637,823 | A * | 6/1997 | Dodge | 84/743 |
| 5,767,432 | A * | 6/1998 | Randolph | 84/743 |
| 6,075,194 | A * | 6/2000 | Marinic et al. | 84/622 |
| 6,150,947 | A * | 11/2000 | Shima | 340/692 |
| 6,376,761 | B1 * | 4/2002 | LaMarra et al. | 84/670 |
| 7,326,849 | B2 * | 2/2008 | Adams et al. | 84/746 |
| 7,711,442 | B2 * | 5/2010 | Ryle et al. | 700/94 |
| 7,786,371 | B1 * | 8/2010 | Moates | 84/645 |
| 7,838,758 | B2 * | 11/2010 | Van Ekstrom | 84/743 |

(Continued)

*Primary Examiner* — Jeffrey Donels

(57) ABSTRACT

A movement actuated tone effects system is provided for manipulating the electrical signal of an electric instrument by moving the electrical instrument in relation to a set of reference axes. A movement actuated tone effects unit is positioned within the electric instrument or within an effects cartridge attached to the electric instrument via a cartridge receiver. The movement actuated tone effects unit includes a motion sensor unit, a processor, a tone effects circuit, and a power source, wherein the motion sensor unit measures the motion of the electric instrument and generates electrical signals directed to the processor. The processor analyzes the electrical signals, determines the appropriate tone effect to apply, and then directs the tone effects circuit to produce the desired tone effect. The movement actuated tone effects unit may further include an integrated speaker, a signal converter, a transmitter, and a device terminal.

18 Claims, 18 Drawing Sheets

(56) References Cited

U.S. PATENT DOCUMENTS

| | | | | |
|---|---|---|---|---|
| 8,075,342 | B1 * | 12/2011 | Harney et al. | 439/620.01 |
| 8,609,972 | B2 * | 12/2013 | Harada et al. | 84/735 |
| 8,642,876 | B2 * | 2/2014 | DeRoche et al. | 84/723 |
| 2003/0041721 | A1 * | 3/2003 | Nishitani et al. | 84/609 |
| 2003/0196542 | A1 * | 10/2003 | Harrison, Jr. | 84/737 |
| 2006/0272489 | A1 * | 12/2006 | Remignanti | 84/723 |
| 2007/0169615 | A1 * | 7/2007 | Chidlaw et al. | 84/723 |
| 2014/0090547 | A1 * | 4/2014 | Udell, III | 84/626 |

* cited by examiner

ACCELEROMETER AND GYROSCOPE CONTROLLED TONE EFFECTS FOR USE WITH ELECTRIC INSTRUMENTS

The current application claims benefit of the U.S. Provisional Patent application Ser. No. 61/946,450 filed on Feb. 28, 2014, claims benefit of the U.S. Provisional Patent application Ser. No. 61/948,448 filed on Mar. 5, 2014, and is a continuation in part of U.S. Utility patent application Ser. No. 14/073,689 filed Nov. 6, 2013 which claims benefit of the U.S. Provisional Patent Application Ser. No. 61/724,106 filed Nov. 8, 2012.

FIELD OF THE INVENTION

The present invention relates generally to instrument tone effects. More specifically, the present invention is a tone effects system operated through the use of an accelerometer and/or gyroscope. Furthermore, the present invention can be applied to any number of handheld instruments.

BACKGROUND OF THE INVENTION

In the music industry, it has often been desirable to alter the sound produced from a musical instrument using sound effects. Sound effects were originally produced using techniques such as manipulating reel-to-reel tape after recording or through microphone placement during recording. As such, early sound effects were limited to in studio productions. The ability for individual musicians to manipulate instrument sounds in-home became available with the emergence of sound effects modules. Sound effects modules are electronic devices that allow musicians to manipulate the sound produced from an electric or electronic instrument. Earlier standalone sound effects modules were impractical as the equipment was both bulky and costly. Thus, the first practical sound effects modules to be used regularly outside of the studio were those built into amplifiers using vacuum tubes. With the emergence of the electronic transistor, sound effects circuitry was able to be even further condensed into small, portable containers commonly referred to as stompbox units. Stompbox units can be designed to produce one or more effects and typically provide a number of controls for adjusting the extent to which the sound of the instrument is manipulated.

While sound effects modules are used with many different types of musical instruments, sound effects modules are most notably used in conjunction with electric guitars in the form of stompboxes. One issue with the use of stompboxes with electric guitars is cable signal loss, which is due, at least in part, to the length of the guitar cable that is used between the guitar and the stompboxes. The cable signal loss across the guitar cable between where the electronic signal of the guitar is generated to where the sound effect is applied results in a loss in tone, which is undesirable to most musicians. Ideally, tone effects are applied as close to the signal generation as possible in order to reduce the amount of signal loss that occurs before the effect is applied. Another issue associated with stompboxes is their accessibility. Stompboxes are typically either placed at the feet of the user or mounted together on a rack. Thus, in order for a musician to adjust the effects controls they must do so with their feet or be within an arm's reach of the rack. Resultantly, effects controls are typically adjusted before a set or an individual song and are not altered throughout.

Therefore it is the object of the present invention to provide a movement actuated tone effects system that is integrated into the body of an electric instrument and allows tone effects to be controlled through the movement of the electric instrument. The present invention provides a motion sensor unit, a processor, and a tone effects circuit, which can be housed within the desired electric instrument or retrofitted to the electric instrument through the use of an effects cartridge and a cartridge receiver. The motion sensor unit includes an accelerometer or a gyroscope or a combination thereof. The tone effects circuit provides the circuitry for manipulating the electrical signal of the electric instrument in the desired manner. The close proximity of the tone effects circuit to the origin of the electrical signal acts to reduce the signal loss before the desired effect is applied to the electrical signal. The motion sensor unit measures the movements of the electric instrument and converts the mechanical motion into electrical signals, which are sent to the processor as input signals. The processor then reads the input signals and outputs appropriate signals to control the tone effects circuit. In this way, the user can activate and deactivate effects, as well as control the parameters of the effects, by simply moving the electric instrument.

DETAIL DESCRIPTIONS OF THE INVENTION

All illustrations of the drawings are for the purpose of describing selected versions of the present invention and are not intended to limit the scope of the present invention.

The present invention is a movement actuated tone effects system for use with electric instruments. The present invention allows a user to apply sound effects to an electric instrument 5 through movement of the electric instrument 5, as opposed to through the manipulation of controls, such as potentiometers, switches, etc. Thus, the movement actuated tone effects system provides a much more dynamic control over the sound of the electric instrument 5. In the preferred embodiment of the present invention, the movement actuated tone effects system is used in conjunction with an electric guitar, however, it is possible for the present invention to be used with any movable/hand-held electric instrument.

Figure 1:
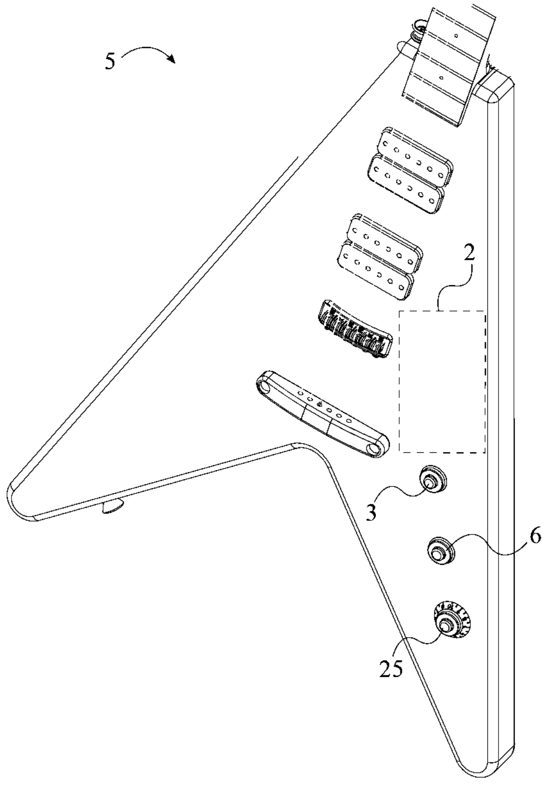
FIG. 1 is a perspective view of the present invention, wherein a movement actuated tone effects unit cased in an effects cartridge is positioned within an electric instrument.
Figure 4:
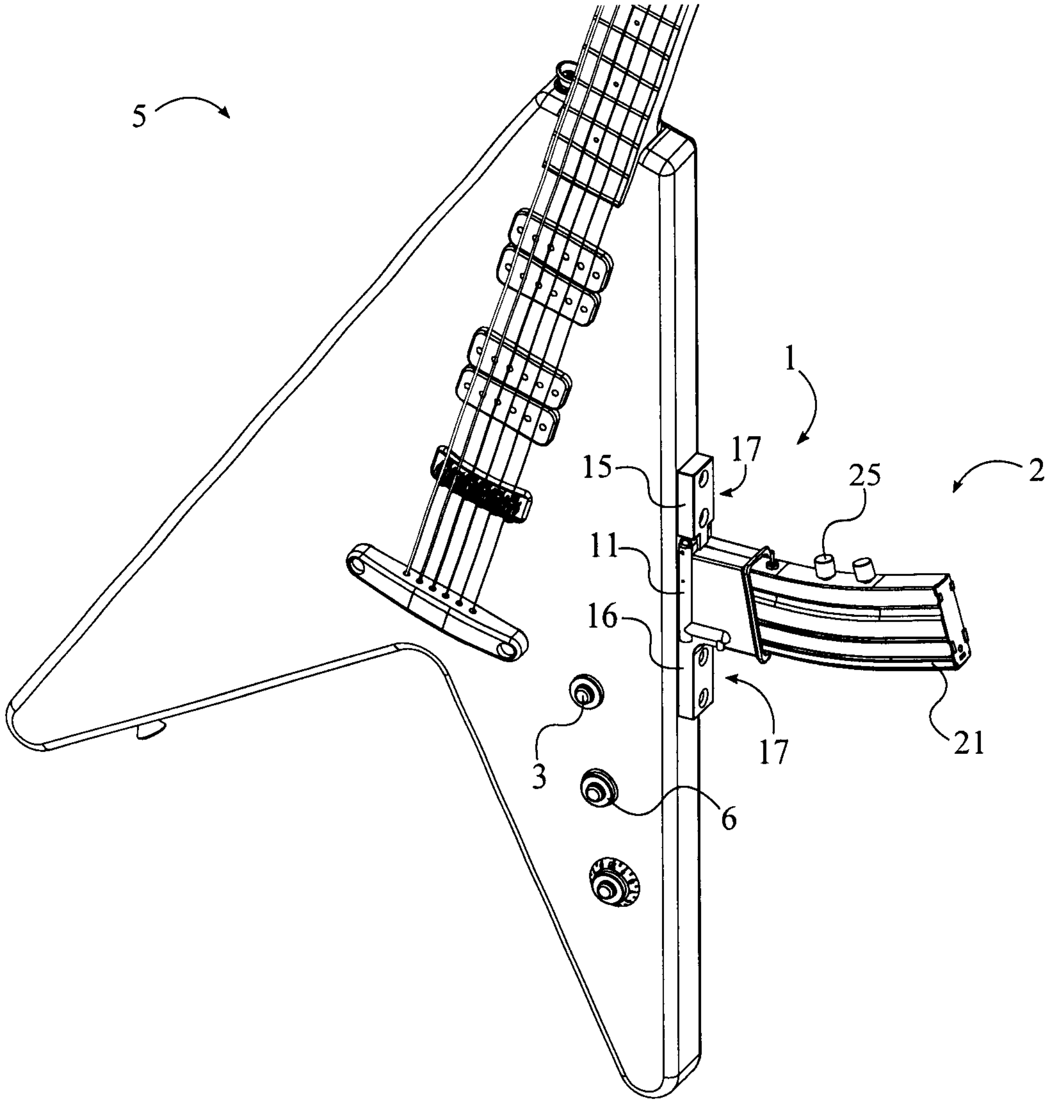
FIG. 4 is a perspective view of the present invention, wherein the effects cartridge is attached to the electric instrument via a cartridge receiver.

The present invention comprises a movement actuated tone effects unit 4 that is integrated with an electronics circuit of the electric instrument 5 in order to manipulate the electrical signal of the electric instrument 5. The movement actuated tone effects unit 4 can be integrated directly within the electric instrument 5 at the time of manufacture as depicted in FIG. 1, or can be adapted as a retro fit addition to the electric instrument 5 as depicted in FIG. 4. The movement actuated tone effects unit 4 comprises a motion sensor unit 49, a processor 42, a tone effects circuit 43, and a power source 44.

Figure 2:
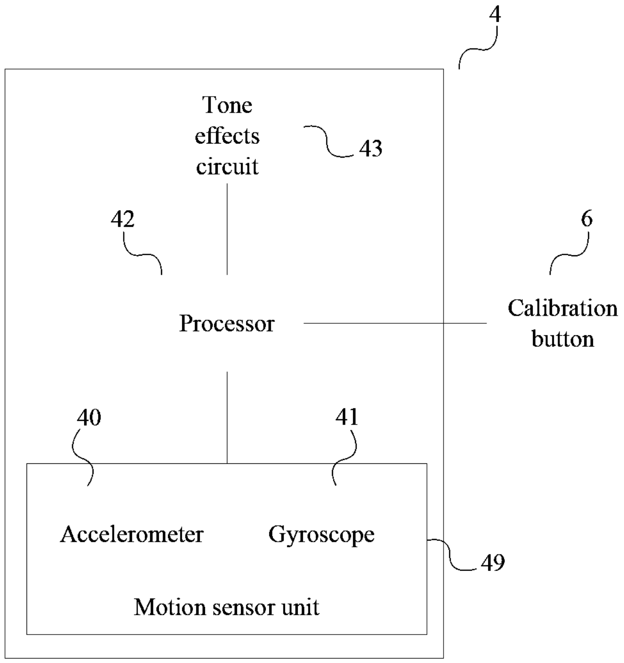
FIG. 2 is a diagram depicting the electronic connections of the movement actuated tone effects unit.
Figure 3:
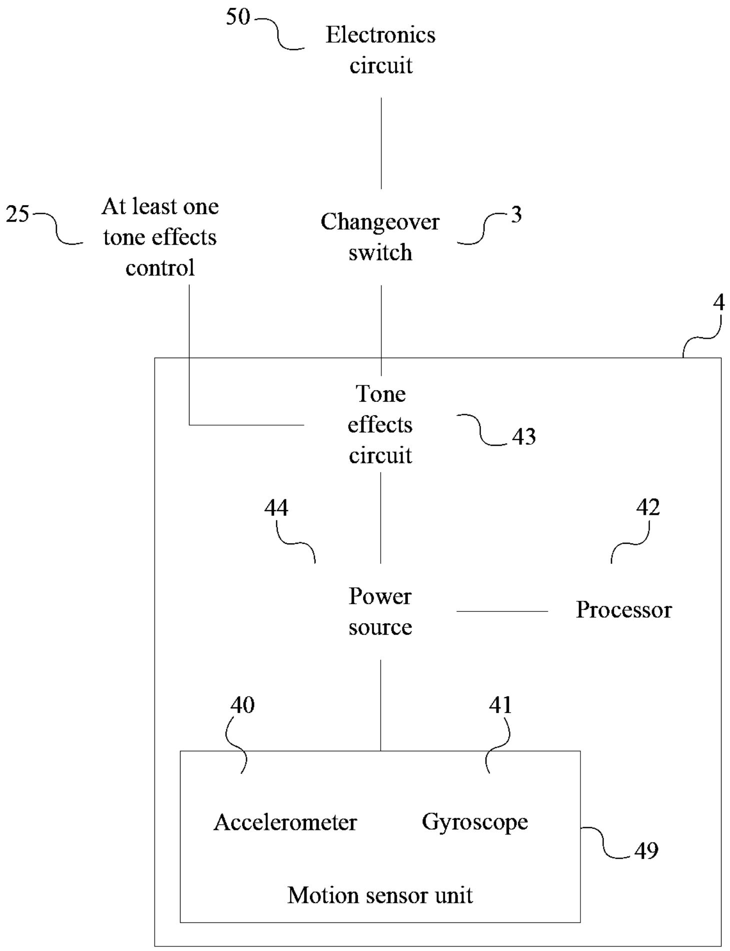
FIG. 3 is a diagram depicting the electrical connections of the movement actuated tone effects unit, wherein a tone effects circuit is electrically connected to a changeover switch through a signal-in port of the effects cartridge.

In reference to FIG. 2-3, the motion sensor unit 49 is the component of the present invention that is used to determine the directional motion of the electric instrument 5. To do so, the motion sensor unit 49 measures the rate of change of the movement of the electric instrument 5 in relation to a set of reference axes (i.e. a x-axis, y-axis, and z-axis). The motion sensor unit can include an accelerometer 40, or a gyroscope 41, or a combination thereof. The accelerometer 40 measures the proper acceleration, or the linear acceleration, of the electric instrument 5, and can be either a single-axis model or a multi-axis model, depending on the application of the accelerometer 40. The accelerometer 40 is not limited in the components that can be used to convert the mechanical motion of the accelerometer 40 into an electrical signal. For example, the accelerometer 40 may comprise piezoelectric, piezoresistive, or capacitive components in accordance with the accelerometer 40 being of the piezoelectric, piezoresistive, or capacitive variety respectively. It is also possible for the present invention to include more than one accelerometer. The gyroscope 41 is used to determine the angular rotational velocity of the electric instrument 5, or the rotation/twist of the electric instrument 5, about the set of reference axes. Specifically, the gyroscope 41 will measure the roll, pitch, and yaw of the electric instrument 5. Similar to the linear motion detected by the accelerometer 40, each of the roll, pitch, and yaw motions detected by the gyroscope 41 is converted into an electrical signal. In the preferred embodiment of the present invention, the motion sensor unit 49 is a three axis gyroscope accelerometer sensor module.

When the motion sensor unit 49 is set in motion, the mechanical motion is converted into electrical signals, which are sent to the processor 42. As such, the motion sensor unit 49 is electronically connected to the processor 42 as depicted in FIG. 2. The processor 42 is any electrical device that is capable of receiving input signals and producing output signals or operations based on pre-defined instructions stored on the processor 42 or a separate memory device, such as a central processing unit, microprocessor, application-specific processor, etc. In the given application, the input signals to the processor 42 are the electrical signals that are output and transmitted by the motion sensor unit 49. If the separate memory device is used, then the separate memory device is electronically connected to the processor 42.

After receiving and processing an input signal from the motion sensor unit 49, the processor 42 sends an output signal to the tone effects circuit 43 in order to manipulate the electrical signal of the electric instrument 5 with the desired tone effect. As such, the tone effects circuit 43 is also electronically connected to the processor 42 as depicted in FIG. 2. The tone effects circuit 43 provides the various electrical components and wiring required to manipulate the electrical signal of the electric instrument 5 in the desired manner. For example, if the effects assembly is to embody a traditional wah-wah pedal, then the effects assembly would comprise electrical components for a tone-filter, such as a potentiometer, resistors, transistors, capacitors, and inductors. The effects assembly may be configured to produce one tone effect or multiple tone effects. Potentiometers used in the tone effects circuit 43, to either produce effects or control the extent of an effect, can be either a digital potentiometer controlled directly by the processor 42, or an analog potentiometer controlled indirectly by the processor 42 through a two-way motor or similar device.

In reference to FIG. 1-2, the present invention may further comprise a calibration button 6. The calibration button 6 is electronically connected to the processor 42 and is used to calibrate the set of reference axes for the motion sensor unit 49. In this way, the electric instrument 5 does not need to be held in the exact same position each time the electric instrument 5 is played. Rather, the user selects an initial playing position for the electric instrument 5 and then actuates the calibration button 6 in order to calibrate the set of reference axes in relation to the initial position of the electric instrument 5.

By utilizing the motion sensor unit 49 to dictate the implementation of the tone effects circuit 43, a whole new playing style is opened to the user. Instead of actuating tone effects through separate stomp boxes, the user can simply motion the electric instrument 5 in the appropriate direction in order to achieve the desired effect. For example, if the tone effects circuit 43 is made to embody a wah-wah pedal, then the wah-wah effect would be produced by moving the electric instrument 5 back and forth along a specific axis from the set of reference axes; as opposed to manipulating a rocking pedal by the user's foot.

If the movement actuated tone effects unit 4 is used to only control the implementation of an effect and not the extent to which the effect is applied, then the present invention may further comprise an at least one tone effects control 25. For example, a distortion effect can be activated and deactivated by pitching the electric instrument 5 about a given axis from the set of reference axes, while the extent to which the electrical signal of the electric instrument 5 is distorted is determined by adjusting the at least one tone effects control 25. As such, the at least one tone effects control 25 is electrically connected to the tone effects circuit 43 as depicted in FIG. 3. The duration for which the effect is applied can also be predetermined through the use of a timer, which may be integrated into the processor 42 or may be independent of the processor 42 yet electronically controlled by the processor 42. The at least one tone effects control 25 can be a simple switch, potentiometer and knob combination, etc. that is electrically connected to the tone effects circuit 43. Alternatively, the at least one tone effects control 25 can be a power switch used to control the current supplied by the power source 44.

In reference to FIG. 3, the power source 44 supplies current to the other components of the present invention, and as such the power source 44 is electrically connected to the motion sensor unit 49, the processor 42, and the tone effects circuit 43. The power source 44 is ideally a battery, either rechargeable or non-rechargeable, and can use any known type of battery technology, such as lithium-ion technology, nickel-cadmium technology, etc. If the power source 44 is a rechargeable battery, then a charging port may also be integrated into the electric instrument 5 or the effects cartridge 2, such that the power source 44 does not need to be removed for recharging. If the power source 44 is a non-rechargeable battery, then an access panel may be integrated into the electric instrument 5 or the effects cartridge 2 in order to allow the power source 44 to be removed and replaced. If the power source 44 is not a battery, then the electric instrument 5 or the effects cartridge 2 may provide a charging port for attaching a power cord between the power source 44 and a power supply such as an outlet.

Figure 6:
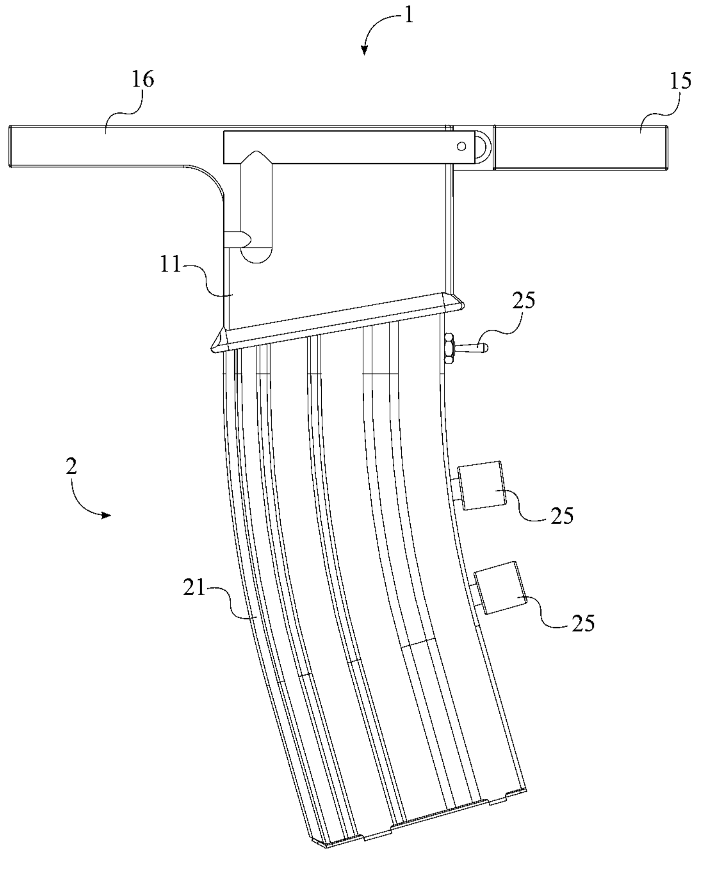
FIG. 6 is a front elevational view of the effects cartridge positioned into the cartridge receiver.
Figure 7:
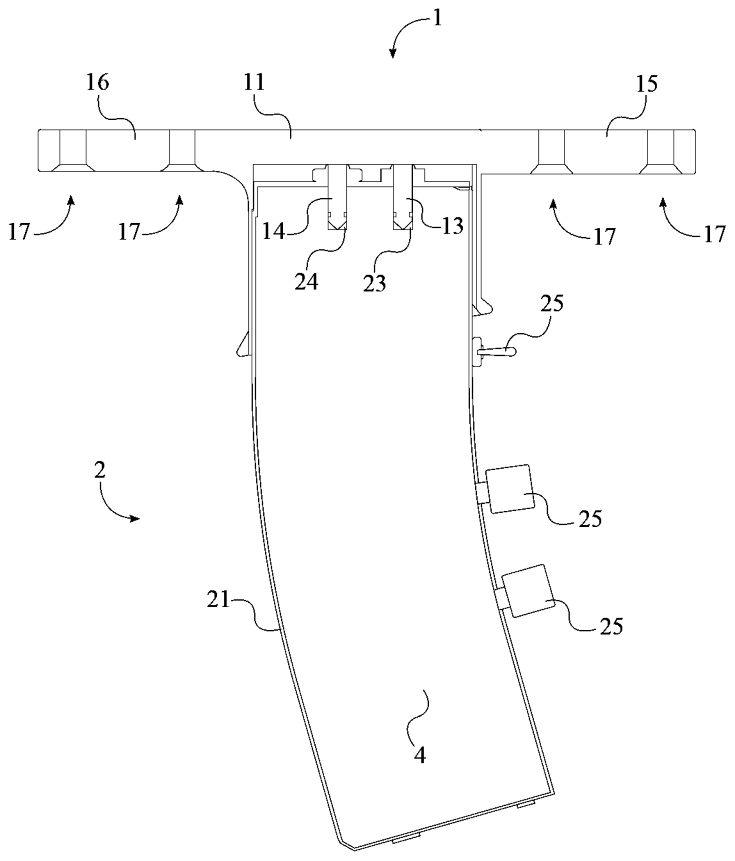
FIG. 7 is a front sectional view thereof showing the movement actuated tone effects unit positioned within the effects cartridge.

In reference to FIG. 6-7, the present invention further comprises an effects cartridge 2 in which the movement actuated tone effects unit 4 is positioned. The effects cartridge 2 comprises a cartridge casing 21, a signal-in port 23, and a signal-out port 24. The cartridge casing 21 is a generally thin-walled structure that provides a housing for the motion sensor unit 49, the processor 42, the tone effects circuit 43, and the power source 44, as well as a frame to which the signal-in port 23 and the signal-out port 24 are mounted. The signal-in port 23 and the signal-out port 24 are positioned adjacent to each other through the cartridge casing 21 and are both connected to the cartridge casing 21. The signal-in port 23 and the signal-out port 24 are electrically connected to the tone effects circuit 43.

In reference to FIG. 1 and FIG. 3, when the movement actuated tone effects unit 4 is manufactured directly into the electric instrument 5, the effects cartridge 2 is positioned within the electric instrument 5. The electronics circuit of the electric instrument 5 is electrically connected to the tone effects circuit 43 through the signal-in port 23 and the signal-out port 24, such that the electrical signal generated through the electronics circuit can be passed through the tone effects circuit 43 in order to apply the desired tone-effects. The movement actuated tone effects unit 4 can be always active, wherein the tone effects circuit 43 is integrated into the normal electrical path of the electronics circuit; or active as needed through the use of a changeover switch 3 integrated into the electric instrument 5, wherein the tone effects circuit 43 is isolated from the normal electrical path of the electronics circuit.

In further reference to FIG. 1 and FIG. 3, if the movement actuated tone effects unit 4 is active as needed, then the changeover switch 3 is ideally integrated into the body of the electronic instrument as the replacement for a pre-existing instrument control, such as the tone knob of an electric guitar; thus minimizing any alterations to the electric instrument 5 (i.e. drilling additional holes into the instrument body). The changeover switch 3 allows the user to direct the electrical signal produced by the electric instrument 5 from a normal path through the electronics circuit to a manipulated path through the tone effects circuit 43. The normal path follows only the electronics circuit of the electric instrument 5, while the manipulated path detours through the tone effects circuit 43 in order to manipulate the electronic signal of the electric instrument 5 to produce the desired sound. As such, the changeover switch 3 is electrically connected to the electronics circuit and electrically connected to the tone effects circuit 43 through the signal-in port 23.

In reference to FIG. 4, in a retro fit embodiment of the present invention, the movement actuated tone effects system further comprises a cartridge receiver 1. The movement actuated tone effects unit 4 is positioned within the effects cartridge 2, while the cartridge receiver 1 is connected to the electric instrument 5. When the effects cartridge 2 is inserted into the cartridge receiver 1, the electrical signal produced by the electric instrument 5 is passed through the tone effects circuit 43 in order to manipulate the electrical signal in the desired manner. Again, the movement actuated tone effects unit 4 can be always active, wherein the electrical signal of the electric instrument 5 is automatically passed through the tone effects circuit 43 when the effects cartridge 2 is inserted into the cartridge receiver 1; or active as needed through the use of the changeover switch 3. The changeover switch 3 can be connected to the electric instrument 5, the effects cartridge 2, or the cartridge receiver 1. The effects cartridge 2 is removably attached to the cartridge receiver 1 in order to allow the user to alternate between different tone effects by replacing the effects cartridge 2.

In reference to FIG. 1 and FIG. 4, similar to the changeover switch 3, if the calibration button 6 is utilized, then the calibration button 6 can be integrated into the electric instrument 5 in place of a pre-existing instrument control. Alternatively, the calibration button 6 can be integrated into the effects cartridge 2 or the cartridge receiver 1 in the retro fit embodiment. Additionally, the at least one tone effects control 25 can be integrated into the electric instrument 5 in the same manner, or integrated into the effects cartridge 2 or the cartridge receiver 1 in the retro fit embodiment.

In the retro fit embodiment of the present invention, the cartridge receiver 1 is preferably mounted externally on the electric instrument 5; however, it is also possible for the cartridge receiver 1 to be mounted to the electric instrument 5 internally. In reference to FIG. 5, the cartridge receiver 1 comprises a receiver body 11, a receiving volume 12, a signal-in terminal 13, a signal-out terminal 14, a first flange 15, a second flange 16, and a plurality of holes 17. The receiver body 11 is the central structure of the cartridge receiver 1 and defines the general shape of the cartridge receiver 1. The receiving volume 12 is positioned into the receiver body 11 and is the empty space into which the effects cartridge 2 is positioned when the effects cartridge 2 is attached to the cartridge receiver 1. Both the signal-in terminal 13 and the signal-out terminal 14 are connected to the receiver body 11 and positioned adjacent to each other within the receiving volume 12. The signal-in terminal 13 and the signal-out terminal 14 are electrically connected to the electronics circuit, and the effects cartridge 2 is electrically connected to the cartridge receiver 1 through the signal-in terminal 13 and the signal-out terminal 14.

The first flange 15, the second flange 16, and the plurality of holes 17 provide a means of connection between the electric instrument 5 and the cartridge receiver 1. The first flange 15 and the second flange 16 are adjacently connected to the receiver body 11, while the plurality of holes 17 traverses through both the first flange 15 and the second flange 16. Screws are inserted through each of the plurality of holes 17 and threaded into screw holes drilled into the electric instrument 5 in order to connect the cartridge receiver 1 to the electric instrument 5. Alternatively, the screws can be threaded directly into the surface of the electric instrument 5. Additional holes are drilled through the electric instrument 5 adjacent to the receiver body 11 in order to allow electrical wire to be connected to the signal-in terminal 13 and the signal-out terminal 14.

Figure 5:
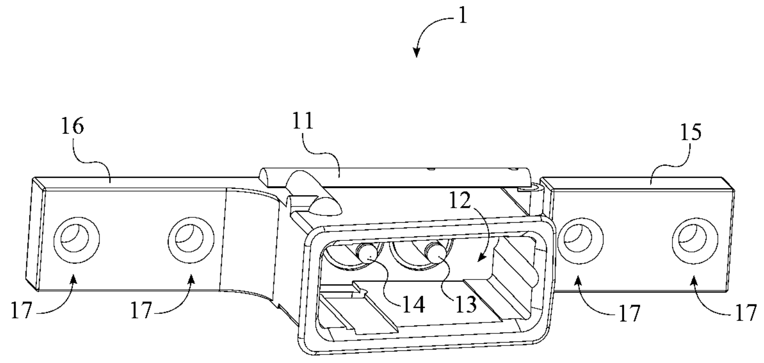
FIG. 5 is a perspective view of the cartridge receiver.

In further reference to FIG. 5, the first flange 15 and the second flange 16 are positioned on the receiver body 11 opposite the receiving volume 12. In this way, the first flange 15, the second flange 16, and the top of the receiver body 11 rest flush against the surface of the electric instrument 5, while the receiving volume 12 is directed away from the electric instrument 5, such that the effects cartridge 2 can be attached to the cartridge receiver 1. The first flange 15 and the second flange 16 are positioned opposite each other across the receiver body 11 in order to securely hold the cartridge receiver 1 flush against the surface of the electric instrument 5. It is also possible for the cartridge receiver 1 to be connected to the electric instrument 5 in any other way.

Figure 8:
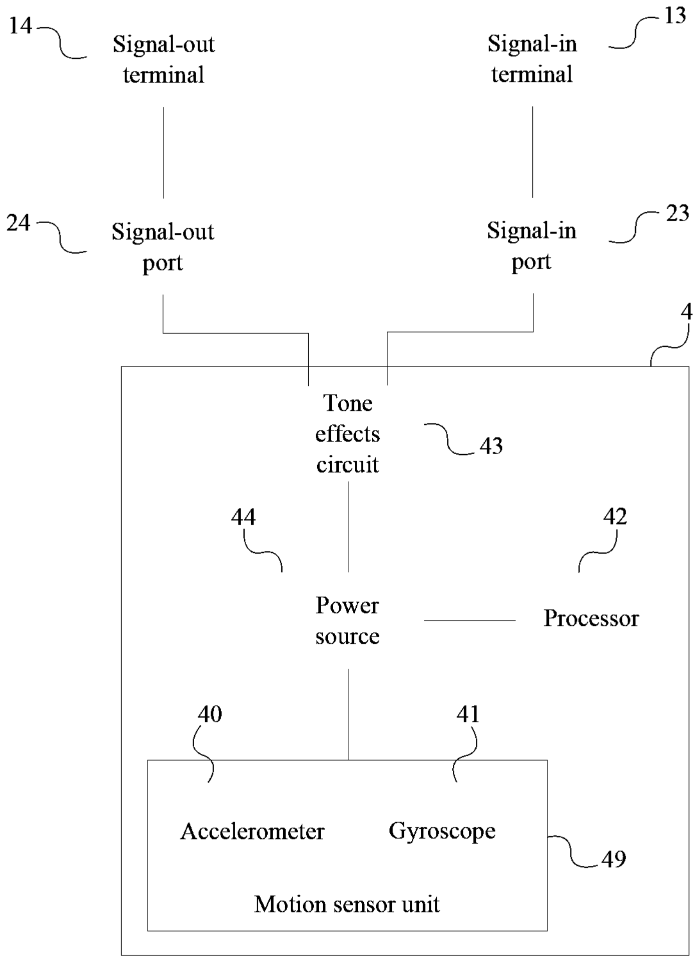
FIG. 8 is a diagram depicting the electrical connections between the effects cartridge and the cartridge receiver.

In reference to FIG. 6-7, when the effects cartridge 2 is attached to the cartridge receiver 1, the top end of the cartridge casing 21 is positioned into the receiving volume 12 of the cartridge receiver 1. As the cartridge casing 21 is inserted into the receiving volume 12, the signal-in terminal 13 engages the signal-in port 23, such that the signal-in terminal 13 is positioned into the signal-in port 23. Similarly, the signal-out terminal 14 engages the signal-out port 24, such that the signal-out terminal 14 is positioned into the signal-out port 24. When the signal-in terminal 13 is positioned into the signal-in port 23, the signal-in terminal 13 is electrically connected to the signal-in port 23 as depicted in FIG. 8, thus allowing the electrical signal of the electric instrument 5 to be passed from the electronics circuit, through the tone effects circuit 43. Likewise, when the signal-out terminal 14 is positioned into the signal-out port 24, the signal-out terminal 14 is electrically connected to the signal-out port 24 as depicted in FIG. 8, thus allowing the manipulated electrical signal to re-enter the electronics circuit of the electric instrument 5.

Figure 9:
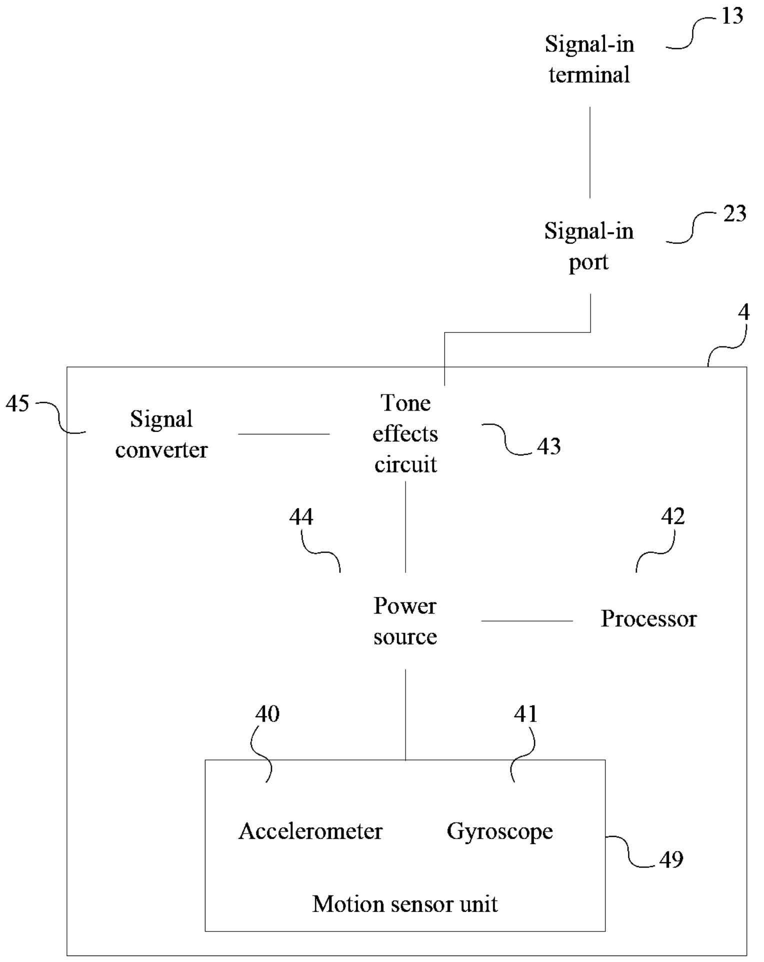
FIG. 9 is a diagram showing a signal converter being electrically connected to the tone effects circuit.
Figure 10:
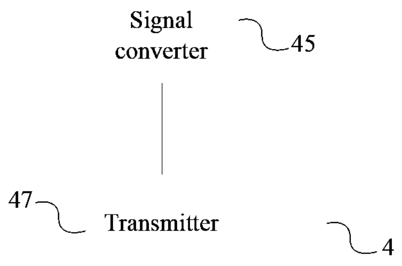
FIG. 10 is a diagram depicting the electronic connection between the signal converter and a transmitter.

In reference to FIG. 9-10, in some embodiments of the present invention, the movement actuated tone effects unit 4 further comprises a signal converter 45 and a transmitter 47. The signal converter 45 alters the electrical signal of the electric instrument 5 from an analog signal to a digital signal, such that the transmitter 47 is able to transmit the digital signal to an electronic device synchronized with the transmitter 47. The electrical signal of the electric instrument 5 is first manipulated by the tone effects circuit 43, then converted to the digital signal by the signal converter 45, and finally transmitted to the synchronized electronic device by the transmitter 47. As such, the signal converter 45 is electrically connected to the tone effects circuit 43 in order to receive the electrical signal and is electronically connected to the transmitter 47 in order to relay the digital signal. The power source 44 is electrically connected to the signal converter 45 and the transmitter 47, and thus supplies current to both the signal converter 45 and the transmitter 47. Once the digital signal is transmitted to the electronic device, the digital signal can then be manipulated by the synchronized electronic device. As the electrical signal of the electric instrument 5 is converted to the digital signal and transmitted to the electronic device, the electrical signal does not need to re-enter the normal path of the electric instrument 5. Therefore, when the signal converter 45 and transmitter 47 are used, the effects cartridge 2 does not need to comprise the signal-out port 24.

Figure 11:
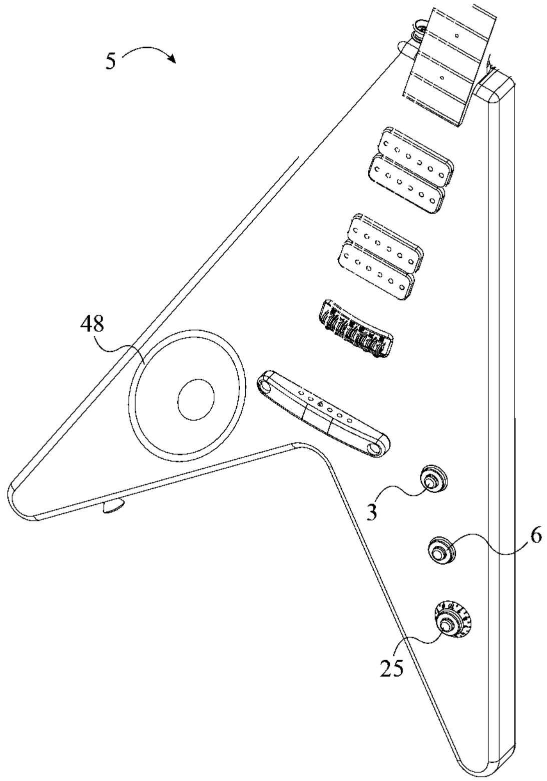
FIG. 11 is a perspective view showing an integrated speaker being positioned through the electric instrument.
Figure 12:
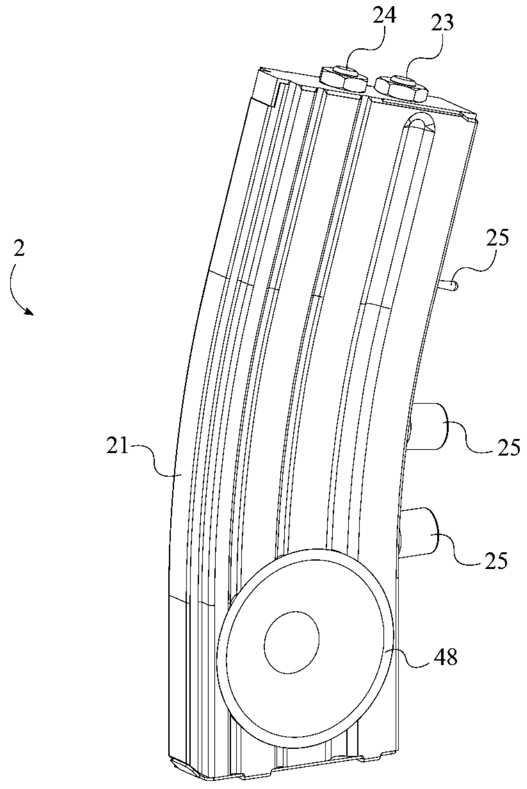
FIG. 12 is a perspective view showing the integrated speaker being positioned through the effects cartridge.
Figure 13:
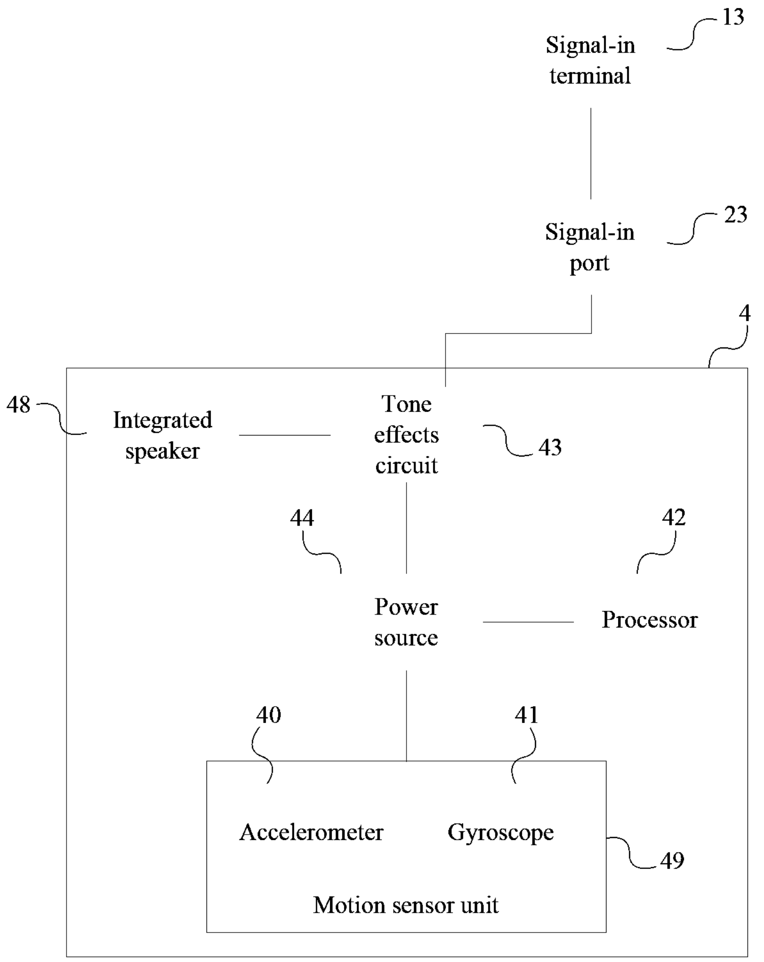
FIG. 13 is a diagram showing the integrated speaker being electrically connected to the tone effects circuit.

In reference to FIG. 11-13, in other embodiments of the present invention, the movement actuated tone effects unit 4 further comprises an integrated speaker 48. The integrated speaker 48 allows the present invention to produce sound directly from the electric instrument 5 or the effects cartridge 2. As such, the integrated speaker 48 is positioned through either the electric instrument 5, as shown in FIG. 11, or the cartridge casing 21, as shown in FIG. 12, and is electrically connected to the tone effects circuit 43 as depicted in FIG. 13. The electrical signal of the electric instrument 5 is first manipulated by the tone effects circuit 43 and is then directed to the integrated speaker 48 in order to drive the integrated speaker 48. The integrated speaker 48 may include a driver through which the electrical signal is first passed in order to amplify the electrical signal, such that the electrical signal is large enough to drive the integrated speaker 48. As the electrical signal of the electric instrument 5 is directed through the integrated speaker 48 built in to the electric instrument 5 or the cartridge casing 21, the electrical signal does not need to re-enter the normal path of the electric instrument 5. Therefore, the effects cartridge 2 does not need to comprise the signal-out port 24.

Figure 14:
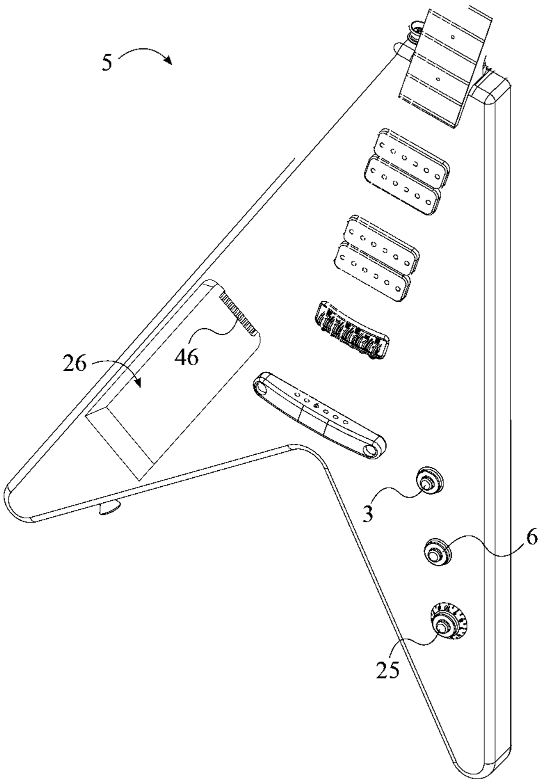
FIG. 14 is a perspective view showing a device dock being positioned into the electric instrument.
Figure 15:
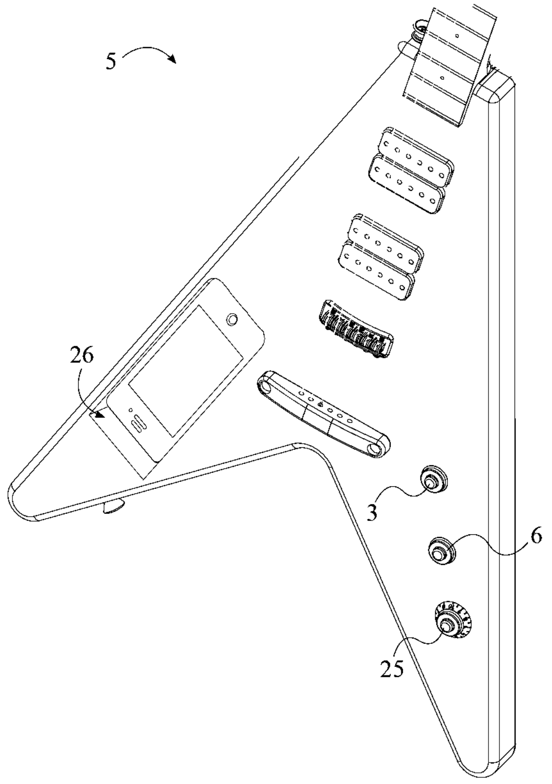
FIG. 15 is a perspective view thereof, wherein an electronic device is positioned within the device dock and connected to a device terminal.
Figure 16:
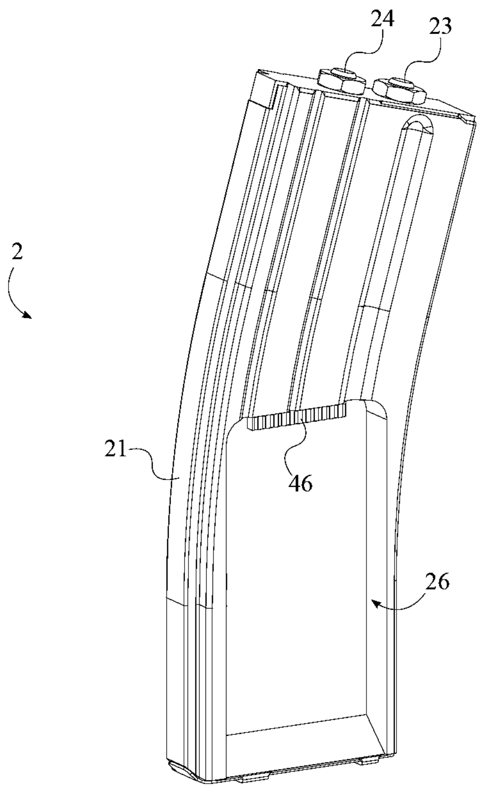
FIG. 16 is a perspective view showing the device dock being positioned into the effects cartridge.
Figure 17:
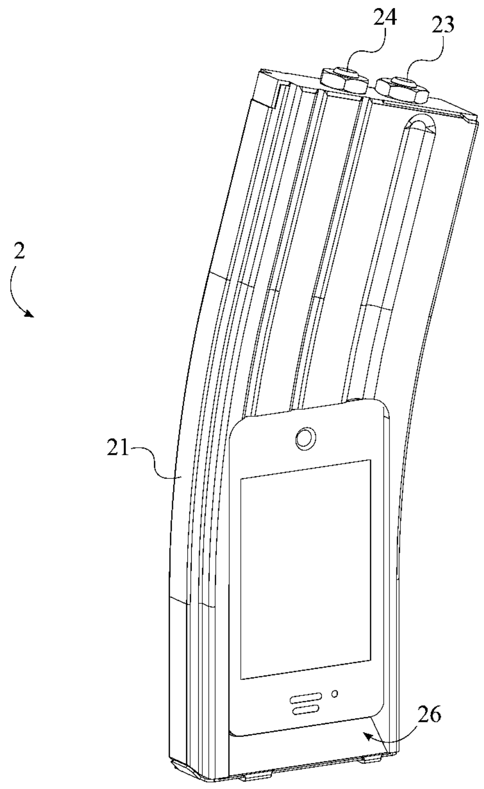
FIG. 17 is a perspective view thereof, wherein the electronic device is positioned into the device dock and connected to the device terminal.
Figure 18:
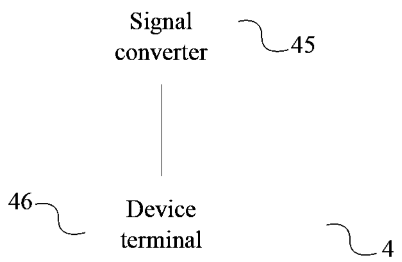
FIG. 18 is a diagram depicting the electronic connection between the signal converter and the device terminal.

In yet other embodiments of the present invention, the movement actuated tone effects unit 4 further comprises a signal converter 45 and a device terminal 46, while either the electric instrument 5 or the effects cartridge 2 further comprises a device dock 26. The device dock 26 is a cavity positioned into the electric instrument 5, as shown in FIG. 14, or the cartridge casing 21, as shown in FIG. 16, that allows an electronic device, such as a mobile phone, to be attached to the electric instrument 5, as shown in FIG. 15, or the effects cartridge 2, as shown in FIG. 17. The device terminal 46 is connected to the electric instrument 5 or the cartridge casing 21, and is positioned into the device dock 26. The device terminal 46 provides an electronic connection, as well as an electrical connection, between the tone effects circuit 43 and the electronic device. As such, the device terminal 46 is electronically connected to the signal converter 45 as depicted in FIG. 18, while the signal converter 45 is electrically connected to the tone effects circuit 43 as depicted in FIG. 9. When the electronic device is positioned within the device dock 26 and attached to the device terminal 46, the incoming electrical signal is directed through the signal converter 45 and converted to the digital signal, wherein the digital signal is then directed to the electronic device through the device terminal 46. As the electrical signal of the electric instrument 5 is converted to the digital signal and then transmitted to the electronic device, the electrical signal does not need to re-enter the normal path of the electric instrument 5. Therefore, the effects cartridge 2 does not need to comprise the signal-out port 24. Additionally, as the device terminal 46 is electrically connected to the tone effects circuit 43, current can be supplied to the tone effects circuit 43 from the electronic device, such that the power source 44 is supplemented or not needed. Additionally, the power source 44 can be used to charge or provide current to the electronic device. The electronic device can be used to apply additional sound effects to the electrical signal after the electrical signal has been amplified and converted, transmit the digital signal to another device, record the digital signal, etc.

The following provides additional examples of use of the tone effects circuit 43 in conjunction with the motion sensor unit 49. In a first example, the tone effects circuit 43 embodies a delay or echo effect circuit. The delay time can be controlled by pitching the electric instrument 5 about an x-axis, while the repeats can be controlled by pitching the electric instrument 5 about a y-axis, wherein the x-axis and the y-axis are from the set of reference axes. In a second example, the tone effects circuit 43 embodies a pitch effects circuit, wherein pitching the electric instrument 5 about the x-axis or y-axis changes the pitch of the note being played. In a third example, the tone effects circuit 43 embodies both the volume and tone circuits of an electrical guitar, such that an electric guitar does not need any external control knobs. The volume and tone settings are instead adjusted by pitching the electric guitar about the set of reference axes.

Although the invention has been explained in relation to its preferred embodiment, it is to be understood that many other possible modifications and variations can be made without departing from the spirit and scope of the invention as herein described.

What is claimed is:

1. A movement actuated tone effects system comprises:

a movement actuated tone effects unit;

an effects cartridge;

the movement actuated tone effects unit comprises a motion sensor unit, a processor, a tone effects circuit, and a power source;

the effects cartridge comprises a cartridge casing and a signal-in port;

the signal-in port being positioned through the cartridge casing;

the signal-in port being connected to the cartridge casing;

the movement actuated tone effects unit being positioned within the cartridge casing;

the tone effects circuit being electrically connected to the signal-in port;

the motion sensor unit and the tone effects circuit being electronically connected to the processor;

the motion sensor unit, the processor, and the tone effects circuit being electrically connected to the power source;

a separate memory device electronically connected to the processor;

a tone effects control adapted to control distortion, the tone effect control electrically connected to the tone effects circuit;

a timer electronically controlled by the processor, the time determining a duration of an effect;

the power source being a rechargeable battery;

a charging port electrically connected to the rechargeable battery;

a calibration button;

the calibration button being electronically connected to the processor;

the calibration button calibrating a set of reference axes for the motion sensor unit;

a changeover switch;

the changeover switch being electrically connected to the tone effects circuit;

the changeover switch integrated into an electric instrument; and the changeover switch, when activated, diverting an electric signal produced by the electric instrument through the tone effects circuit.

2. The movement actuated tone effects system as claimed in claim 1, wherein the motion sensor unit includes an accelerometer.

3. The movement actuated tone effects system as claimed in claim 1, wherein the motion sensor unit includes a gyroscope.

4. The movement actuated tone effects system as claimed in claim 1 comprises:

an at least one tone effects control; and the at least one tone effects control being electrically connected to the tone effects circuit.

5. The movement actuated tone effects system as claimed in claim 1 comprises:

the effects cartridge further comprises a signal-out port;

the signal-out port being positioned through the cartridge casing;

the signal-out port being connected to the cartridge casing;

the signal-out port being positioned adjacent to the signal-in port; and the tone effects circuit being electrically connected to the signal-out port.

6. The movement actuated tone effects system as claimed in claim 1 comprises:

the movement actuated tone effects unit further comprises a signal converter and a transmitter;

the signal converter being electrically connected to the tone effects circuit; and the signal converter being electronically connected to the transmitter.

7. The movement actuated tone effects system as claimed in claim 1 comprises:

the movement actuated tone effects unit further comprises an integrated speaker; and the integrated speaker being electrically connected to the tone effects circuit.

8. The movement actuated tone effects system as claimed in claim 7 comprises:

the integrated speaker being positioned through the cartridge casing.

9. The movement actuated tone effects system as claimed in claim 1 comprises:

the movement actuated tone effects unit further comprises a device terminal and a signal converter;

the signal converter being electrically connected to the tone effects circuit; and the signal converter being electronically connected to the device terminal.

10. The movement actuated tone effects system as claimed in claim 9 comprises:

the effects cartridge further comprises a device dock;

the device dock being positioned into the cartridge casing;

the device terminal being connected to the cartridge casing; and the device terminal being positioned into the device dock.

11. The movement actuated tone effects system as claimed in claim 1 comprises:

a cartridge receiver;

the cartridge receiver comprises a receiver body and a signal-in terminal;

the signal-in terminal being connected to the receiver body;

the effects cartridge being attached to the cartridge receiver;

the signal-in terminal being positioned into the signal-in port; and the signal-in terminal being electrically connected to the signal-in port.

12. The movement actuated tone effects system as claimed in claim 11 comprises:

the effects cartridge further comprises a signal-out port;

the cartridge receiver further comprises a signal-out terminal;

the signal-out terminal being connected to the receiver body;

the signal-out terminal being positioned into the signal-out port; and the signal-out terminal being electrically connected to the signal-out port.

13. The movement actuated tone effects system as claimed in claim 1 comprises:

a cartridge receiver;

the cartridge receiver comprises a receiver body, a receiving volume, and a signal-in terminal;

the receiving volume being positioned into the receiver body;

the signal-in terminal being positioned within the receiving volume; and the cartridge casing being positioned into the receiving volume.

14. The movement actuated tone effects system as claimed in claim 13 comprises:

the cartridge receiver further comprises a signal-out terminal;

the signal-out terminal being positioned adjacent to the signal-in terminal; and the signal-out terminal being positioned within the receiving volume.

15. The movement actuated tone effects system as claimed in claim 1 comprises:

a cartridge receiver;

the cartridge receiver comprises a receiver body, a first flange, a second flange, and a plurality of holes;

the first flange and the second flange being adjacently connected to the receiver body;

the first flange and the second flange being positioned opposite each other across the receiver body;

the plurality of holes traversing through both the first flange and the second flange; and the effects cartridge being attached to the cartridge receiver.

16. The movement actuated tone effects system as claimed in claim 1 comprises:

the effects cartridge being positioned within the electric instrument.

17. The movement actuated tone effects system as claimed in claim 16 comprises:

the movement actuated tone effects unit further comprises an integrated speaker; and the integrated speaker being positioned through the electric instrument.

18. The movement actuated tone effects system as claimed in claim 16 comprises:

the electric instrument comprises a device dock;

the movement actuated tone effects unit further comprises a device terminal;

the device dock being positioned into the electric instrument;

the device terminal being connected to the electric instrument; and the device terminal being positioned into the device dock.

* * * * *